(12) United States Patent
Pugel

(10) Patent No.: US 7,027,520 B2
(45) Date of Patent: Apr. 11, 2006

(54) METHOD AND APPARATUS FOR SIMULTANEOUSLY RETRIEVING PORTIONS OF A DATA STREAM FROM DIFFERENT CHANNELS

(75) Inventor: Michael Anthony Pugel, Noblesville, IN (US)

(73) Assignee: Thomson Licensing, Boulogne-Billancourt (FR)

(*) Notice: Subject to any disclaimer, the term of this patent is extended or adjusted under 35 U.S.C. 154(b) by 777 days.

(21) Appl. No.: 09/942,810

(22) Filed: Aug. 30, 2001

(65) Prior Publication Data

US 2003/0165200 A1    Sep. 4, 2003

(51) Int. Cl.
*H04K 1/10* (2006.01)
*H04L 27/28* (2006.01)

(52) U.S. Cl. .................. 375/260; 375/342; 375/349; 375/350

(58) Field of Classification Search ................ 375/316, 375/340, 342, 343, 346, 349, 350, 260; 324/67.21; 341/11
See application file for complete search history.

(56) References Cited

U.S. PATENT DOCUMENTS

| | | | |
|---|---|---|---|
| 5,517,250 A | 5/1996 | Hoogenboom et al. | 348/467 |
| 5,574,505 A | 11/1996 | Lyons et al. | 348/426 |
| 5,621,463 A | 4/1997 | Lyons et al. | 348/387 |
| 5,729,292 A | 3/1998 | Acampora et al. | 348/390 |
| 5,808,463 A * | 9/1998 | Nagano | 324/76.21 |
| 5,838,268 A * | 11/1998 | Frenkel | 341/111 |
| 5,864,557 A | 1/1999 | Lyons | 370/444 |
| 5,920,572 A | 7/1999 | Washington et al. | 370/535 |
| 6,052,384 A | 4/2000 | Huang | 370/468 |
| 6,118,786 A | 9/2000 | Tiernan et al. | 370/416 |
| 6,138,012 A | 10/2000 | Krutz et al. | 455/427 |
| 6,195,368 B1 | 2/2001 | Gratacap | 370/535 |
| 6,195,403 B1 | 2/2001 | Anderson | 375/376 |
| 6,233,253 B1 | 5/2001 | Settle et al. | 370/474 |
| 6,233,255 B1 | 5/2001 | Kato et al. | 370/486 |
| 6,240,140 B1 | 5/2001 | Lindbergh et al. | 375/260 |
| 6,246,701 B1 | 6/2001 | Slattery | 370/503 |

FOREIGN PATENT DOCUMENTS

| | | |
|---|---|---|
| WO | WO 01/30039 A1 | 4/2001 |
| WO | WO 01/47281 A2 | 6/2001 |

* cited by examiner

*Primary Examiner*—Phuong Phu
(74) *Attorney, Agent, or Firm*—Joseph J. Laks; Ronald H. Kurdyla; Guy H. Eriksen

(57) ABSTRACT

An apparatus and method for simultaneously processing each of a plurality of carrier signals having data modulated thereon, wherein a complete data stream is formed by extracting at least portions of at least two of the modulated signals and combining the extracted portions. Each of the portions of the complete data stream comprises a plurality of packets having associated with them respective stream identification and sequence codes, where the stream identification identifies the complete bit stream to be formed, and the sequence codes identify the order or position within the complete bitstream that the associated data packets should be inserted.

28 Claims, 4 Drawing Sheets

METHOD AND APPARATUS FOR SIMULTANEOUSLY RETRIEVING PORTIONS OF A DATA STREAM FROM DIFFERENT CHANNELS

This application is related to simultaneously filed U.S. patent application Ser. No. 09/942,886, filed Aug. 30, 2001 entitled, METHOD, APPARATUS AND DATA STRUCTURE ENABLING MULTIPLE CHANNEL DATA STREAM TRANSMISSION, which is incorporated herein by reference in its entirety.

BACKGROUND OF THE INVENTION

The invention relates to communications systems and, more particularly, a receiver capable of simultaneously receiving from each of a plurality of data channels respective portions of a data stream.

Communications systems having higher data throughput and greater efficiency in the use of available bandwidth are increasingly in demand. In a typical communications system, such as a satellite communications system, a satellite provides a plurality of communications channels to terrestrial receivers. Each communications channel has associated with it, for example, a particular transponder, a particular polarization and the like. Normally, each defined channel broadcasts at its maximum data rate.

Where the amount of data to be transmitted is less than the amount of data that a channel is capable of transmitting, the defined channel is underutilized. In this case, the defined channel may transmit NULL packets during those time slices within which there is no data available to be transmitted. Where the data to be transmitted requires more bandwidth than is available on the channel, an alternate channel having greater available capacity must be selected. Thus, communications channels typically operate at less than a 100% utilization level due to the likelihood that the number of data streams to be transmitted, and the amount of data within each stream, are likely not to match the bandwidth available in the transmission channels.

SUMMARY OF THE INVENTION

The invention comprises an apparatus and method for simultaneously processing each of a plurality of carrier signals having data modulated thereon, wherein a complete data stream is formed by extracting at least portions of at least two of the modulated signals and combining the extracted portions. Each of the portions of the complete data stream comprises a plurality of packets having associated with them respective stream identification and sequence codes, where the stream identification identifies the complete bit stream to be formed, and the sequence codes identify the order or position within the complete bitstream that the associated data packets should be inserted.

An apparatus, in accordance with an embodiment of the present invention, comprises an analog to digital converter, for directly converting a plurality of carrier signals into a digital data stream; a plurality of channel processors, for simultaneously extracting from the digital data stream data carried by respective carrier signals; and a processor, for combining at least portions of the data extracted from at least two carrier signals to produce a complete bitstream, the extracted data having associated with it stream identifier and sequence code information for determining, respectively, the complete bitstream corresponding to the extracted data and the sequence within the complete bitstream of the extracted data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
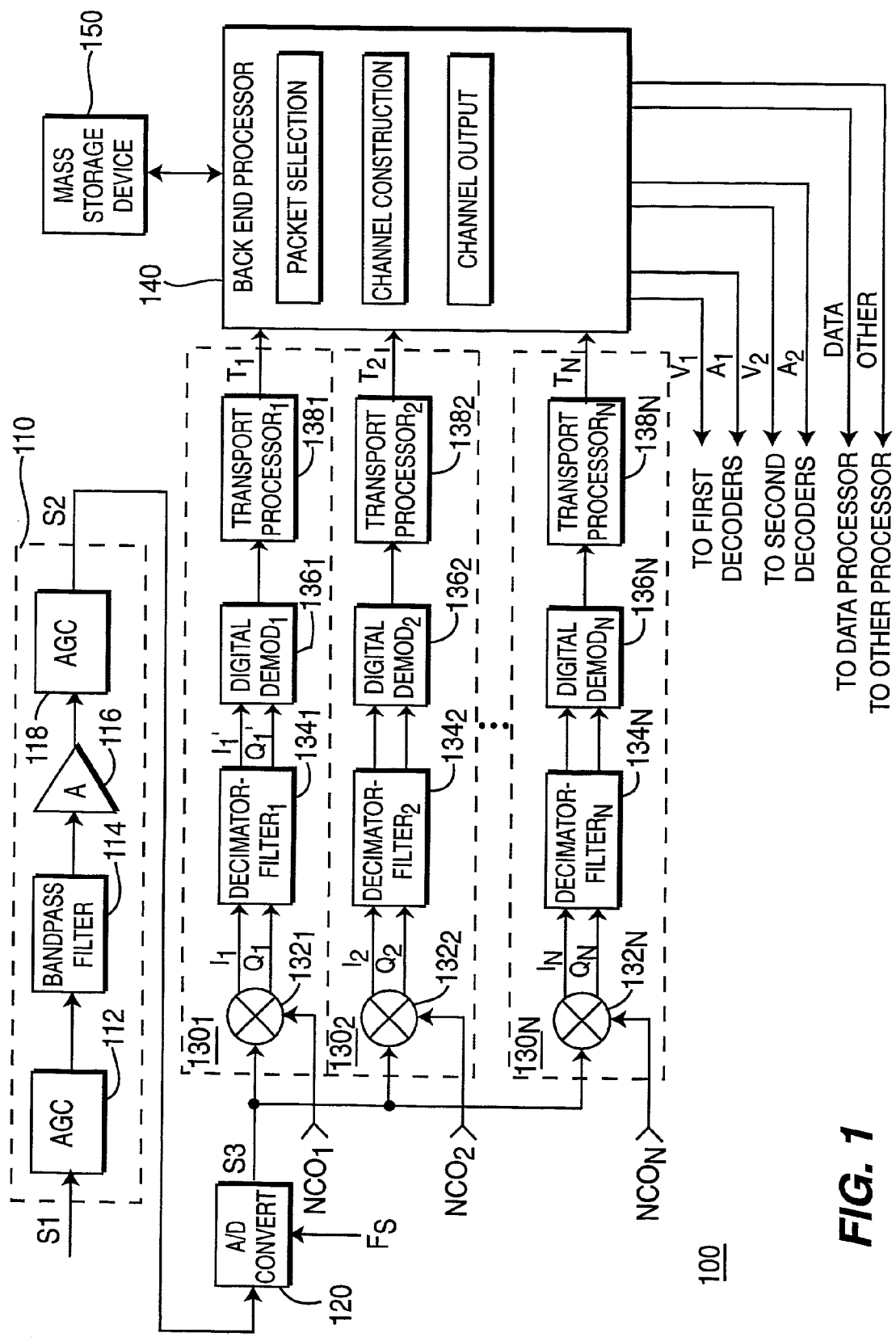
FIG. 1 depicts a high-level block diagram of an exemplary receiver usable in accordance with the principles of the invention.

FIG. 1 depicts a high-level block diagram of an exemplary receiver usable in accordance with the principles of the invention. Specifically, the receiver 100 comprises a direct broadcast satellite (DBS) receiver comprising an analog processing section 110, an analog-to-digital (A/D) converter 120, a plurality of channel processors $130_1$ through $130_n$ (collectively channel processors 130), a back end processor 140 and, optionally, a mass storage device 150.

The analog processor 110 receives an analog input signal S1 comprising, illustratively, a 950–1,450 MHz signal having modulated thereon a plurality of analog carrier signals having, illustratively, bandwidths of 24 MHz and center frequencies separated by 29.16 MHz from the center frequencies of adjacent analog carrier signals. The analog processor 110 performs a signal conditioning function to produce an output signal S2 suitable for processing by the A/D converter 120.

The analog processing section 110 comprises the series combination of an optional first analog gain control (AGC) function block 112, a bandpass filter 114, an amplifier 116 and a second AGC 118. The first optional AGC amplifies the input signal S1 (as needed). The bandpass filter 114 rejects out-of-band frequency components (e.g., those frequency components approximately below 950 MHz and above 1,450 MHz). The amplifier 116 boosts the resulting passband limited signal to a level appropriate for processing by the A/D converter 120. The AGC 118 operates to insure that the amplified signal remains consistent over a relatively large range of input signals, such as is available from the "outdoor" portion (i.e., satellite disk and associated circuitry) of a satellite system. The output signal S2 comprises, illustratively, the input signal S1 having been processed to provide 50 db gain and 45 db automatic gain control.

The A/D converter 120 receives all (illustratively) 16 channels simultaneously and produces at its output a digital bit stream S3 that is representative of the 16 channels in a digital format. In the exemplary satellite receiver embodiment, the A/D converter 120 comprises an 8 bit A/D converter approximately 1.5 GHz. Thus, given the relevant input frequencies of signal S2 of 950 to 1,450 MHz, the output signal S3 comprises a digital signal having an inverted spectrum from 50 to 550 MHz. The output signal S3 of the A/D converter 120 is coupled to an input of each mixer 132 within the channel processors $130_1$ through $130_N$.

The A/D converter 120 comprises a high-speed analog-to-digital converter operating at a sampling rate of FS. The A/D converter 120 receives the signal S2 including, illustratively, the frequency components associated with each of 16 transponders having the same polarization (i.e., left hand or right hand) within a DBS system. Within the context of a DBS system such as directTV, left hand and right hand circular polarization is utilized in a known manner to increase the available bandwidth and, therefore, increase the total number of channels that may be provided to customers.

In one embodiment of the invention, the A/D converter 120 operates with a sampling frequency below 950 MHz. In another embodiment of the invention, the A/D converter 120 does not use undersampling. Specifically, in this embodiment of the invention, the Nyquist criteria is satisfied by sampling at two times the highest frequency (i.e., 3 GHz). However, since the bandpass filter 114 and the analog processor 110 band limit the input signal, such a high sampling rate may be avoided using the undersampling techniques described herein. By utilizing a lower sampling frequency, a lower cost A/D converter may be employed.

Each of the channel processors 130 comprises a mixer 132, a decimator/filter 134, a digital demodulator 136 and a transport processor 138. It will be appreciated by those skilled in the art that the digital demodulator 136 and transport processor 138 may be combined into a single integrated circuit known as a link IC.

Each of the mixers 132 mixes the digital signal S3 with a respective numerically controlled oscillator (NCO) signal to produce respective in-phase I and quadrature Q signal components, which are coupled to the respective decimator/filters 134. The respective NCO frequency is selected to derotate a desired signal or channel. Each mixer 132 operates to perform a frequency rotation function, whereby the selected channel is rotated to baseband from the undersampled digital signal S3. This may be accomplished using a numerical table to extract (or rotate) the desired channel frequency from the digital signal comprising all available frequencies processed by the A/D converter 120.

The decimator/filter 134 receives the respective in-phase I and quadrature Q components of the derotated and selected channel. The decimator/filter 134 processes these orthogonal components to extract the desired signal. Briefly, after the mixer 132 derotates the selected signal to baseband (i.e., by multiplying the signal by sine and cosine functions), non-desired channel energy is removed from the derotated signal. Specifically, given the exemplary embodiment whereby 16 channels are simultaneously processed, it is desired to retain only the channel energy associated with a specific desired channel. After filtering the derotated baseband signal to remove undesired channel energy, the remaining signal is decimated to remove excess energy associated with the desired channel. For example, since the sampling frequency of the A/D converter is 1.5 gigasamples per second, frequency components from zero to 750 MHz may be present. Those samples not associated with the (approximately) 24 MHz associated with a selected channel are unnecessary. The decimation process removes the unwanted samples. As will be appreciated by those skilled in the art, the 24 MHz associated with a selected channel is actually two 12 MHz channels due to the sine/cosine processing of the derotator or mixer 132. The resulting derotated, filtered, and decimated signal is then provided to the respective demodulator 136.

The demodulator 136 operates to demodulate the provided signal and retrieve therefrom the original data stream modulated thereon. Since each of the channel processors 130 operates simultaneously, the respective demodulators 136 are operating upon substantially simultaneous transmitted streams. The digital demodulators 136 provide respective demodulated data streams to the respective transport processors 138.

In an exemplary embodiment, the A/D converter 120 operates using an 8 bit sample. Within a DBS system, a 4-bit sample is typically utilized for QPSK demodulator. More or fewer bits may be used for other modulation schemes. However, since the A/D converter 120 in the exemplary embodiment operates to undersample a bandwidth-limited DBS signal comprising 16 channels, and since the amount of resolution required is a sum of powers relationship, one channel normally demodulated is decoded with 4–6 bits of resolution scales to approximately 16 channels being demodulated or decoded using 8 bits of resolution. Those skilled in the art will know that more or fewer bits of resolution may be employed where the accuracy of the A/D converter 120 is increased or decreased, the initial coding scheme utilizes a more complex topology and other factors.

In one embodiment of the invention, the transport processors 138 provide baseband video and audio streams to the back-end processor 140. In this embodiment of the invention, the various transport processors $138_1$ through $138_N$ communicate with each other and otherwise exchange information such that the baseband audiovisual streams may be recreated by extracting stream portions from the various channels and assembling the extracted stream portions into an entire audiovisual stream or streams. In an alternate embodiment of the invention, each transport processor 138 provides one of an output transport stream or several elementary streams which are subsequently combined into a single transport stream including audiovisual sub-streams, or the audiovisual sub-stream portions are combined into complete audiovisual sub-streams.

In the embodiment whereby the transport processors 138 provide baseband video and/or audio information, such baseband video and/or audio information is provided to baseband audiovisual processors for standard processing prior to presentation. In the case of the output of the transport processors 138 comprising encoded audiovisual information, such encoded audiovisual information is provided to appropriate audio and video decoders for processing prior to presentation.

The optional mass storage device 150 may be used to store portions of a complete bitstream that are transported via a plurality of channels and received over a relatively long period of time. For example, a server may transmit to the receiver a movie or other content via a plurality of channels in non-real-time, such as overnight. Thus, in this embodiment of the invention, the mass storage device 150 is used to store a file piece by piece in response to the reception and processing of pieces or portions of the file by the various channel processors 130.

Figure 3:
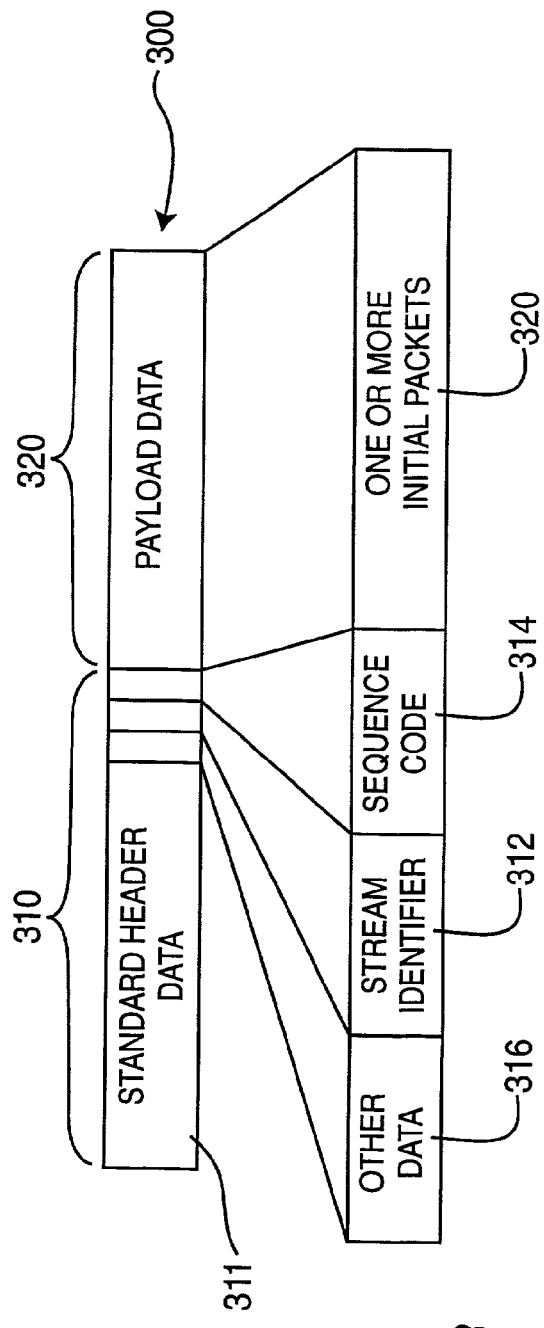
FIG. 3 depicts an exemplary data structure used in accordance with the principles of the present invention.

A network packet structure suitable for implementing the present invention will be described in more detail below with respect to FIG. 3. Briefly, the network packet structure 300 of FIG. 3 provides for the inclusion within a payload portion of one or more packets from the initial packet stream. Additionally, within the network packet payload portion or header portion is included information suitable for reforming the sequence of the initial packet stream. Additionally, identification information is provided such that a plurality of initial packet streams may be reformed at one or more receivers.

In addition to the regular overhead that is carried by the choice of encoding and/or modulation within the communications system, the following information may also be included: (1) the number of transponders employed within the communications system and the identification of those transponders used to carry desired data; (2) the timing of the use of the employed transponders, including information relevant to changing between different transponders for contiguous data or related data streams; (3) the order of the data transmitted and any redundancy of such data, along with a map or other means for facilitating the recombination of such data; and (4) default display information.

Figure 2A:
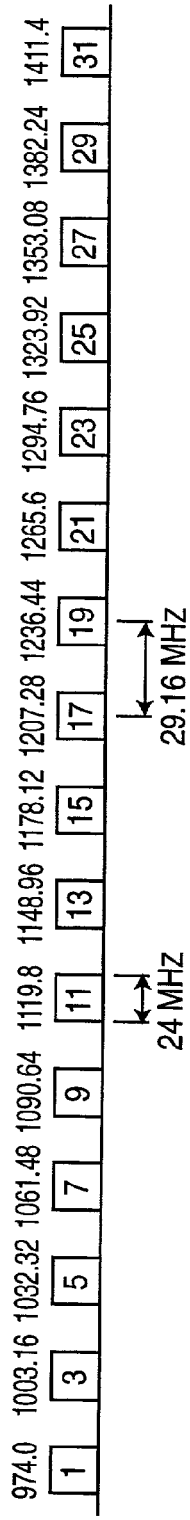
FIG. 2 depicts a graphical representation of a DBS frequency plan, exemplary of a frequency plan which may be used in accordance with the principles of the invention.
Figure 2B:
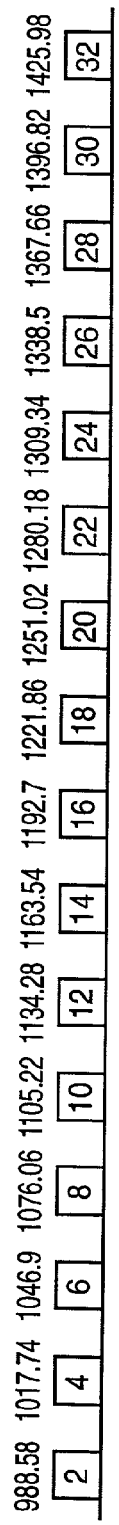

FIG. 2 depicts a graphical representation of a DBS frequency plan, exemplary of a frequency plan which may be used in accordance with the principles of the invention. Specifically, FIG. 2A depicts the nominal DSS frequency plan for right hand circularly polarized (RHCP) channels, while FIG. 2B depicts the nominal DSS frequency plan for left hand circularly polarized (LHCP) channels. Given a total of, illustratively, 32 channels, the 16 odd channels are RHCP channels and are shown in FIG. 2A, while the 16 even channels are LHCP channels and are shown in FIG. 2B. The odd channels start at a channel center frequency of 974.0 MHz (channel 1) and extend to 1,413.4 MHz (channel 31). Each channel is 24 MHz in width, each center frequency is separated by an adjacent center frequency by 29.16 MHz. Similarly, the even channels start at a channel center frequency of 988.5 MHz (channel 2) and extend to a channel center frequency of 1,425.98 MHz (channel 32). DSS is a trademark of Hughes Electronics. A packet structure suitable for use within the DSS system is described in "DSS Transport Protocol" Version 1.1, 12 Feb. 1996, which protocol is incorporated herein by reference in its entirety.

In one embodiment of the invention, the 32 channels provided by the network interface/link 130 of FIG. 1 substantially conform to the DSS frequency plan of FIG. 2. However, it will be appreciated by those skilled in the art that the present invention may be practiced with any frequency plan and any number of channels. It is noted that the subject invention finds particular utility within the context of two or more transmission channels due to the ability to split or distribute an initial packet stream among the two or more transmission channels.

FIG. 3 depicts an exemplary data structure used in accordance with the principles of the present invention. Specifically, the data structure 300 comprises a packet structure having a header portion 310 and a payload portion 320.

The header portion 310 comprises standard header data 311, stream identifier data 312, and sequence code 314. In one embodiment, the header portion 310 is further augmented by other data 316.

The payload portion 320 is used to carry one or more packets from, for example, an initial packet stream. By associating each of the one or more initial packets of the payload portion with a stream identifier and sequence code, a receiver may rearrange packets received from a plurality of transport channels to produce the initial packet stream for subsequent processing. In this manner, an initial packet stream may be transported using a plurality of transport channels and reformed at a receiver for subsequent processing. In the case of a plurality of packets being included within a payload portion of a network packet data structure, the plurality of packets or a group of packets are preferably arranged in a known sequence such that a single sequence code may represent the point within an initial bit stream that the entire group of packets should be inserted.

In one embodiment, one or more initial data stream packets such as Moving Picture Experts Group (MPEG) transport packets are carried within the payload data portion 320 of an internet protocol (IP) packet 300. The standard header data 311 of the header portion 310 is augmented by including a stream identifier 312 and sequence code 314 indicative of, respectively, the specific initial data stream to which the one or more packets within the payload belong, and the sequence within that specific initial data stream of the one or more packets within the payload portion. It is assumed that the one or more MPEG transport packets within the payload portion of the carrier packet structure are arranged in the same order in which they are normally provided in the MPEG transport stream itself, although schemes not so arranged may also be implemented and still incorporate and embody the principles of the present invention.

In a "channel hopping" embodiment of the invention, the stream identifier data 312 and sequence code 314 associated with one or more packets or groups of packets within a payload portion of the data structure 300 of FIG. 3 are augmented by other data 316 comprising a channel identifier field and a time of transmission field. The channel identifier data is used to identify which transmission or transport channel(s) will be used to transport the stream identified in field 312. The time of transmission data is used to indicate the actual time of such transmission(s). In this manner, where a receiver is capable of processing a smaller number of transport channels, a "channel hopping" mechanism is implemented whereby one or more of the channel processors at the receiver select the identified channel(s) at the identified time(s) to retrieve therefrom the stream identified in field 312.

To reduce the number of channel processors, in one embodiment of the invention, only a subset of the received channels is processed. In this embodiment, a transmitter inserts content into several transport channels for subsequent processing by a receiver. Similarly, the receiver processes each of the transport channels to retrieve the inserted content. For example, in one embodiment a receiver provides, illustratively, two channel processors 130, each of which is capable of processing any one of, illustratively, 16 received transport channels. In this embodiment, in addition to stream identification and sequence code information, channel information and transmit timing information is also provided to enable the "channel hopping" scheme. In this channel hopping scheme, transported data associated with a single identified stream is provided via a plurality of transport channels. The channel information and time information indicate, respectively, which channel is providing the data and at what time is that channel providing the data.

In this manner, one or more channel processors may be caused to process different channels at different times to selectively retrieve packets associated with a desired identified data stream. This embodiment of the invention is especially useful where some of the channels are not available at some times. Thus, when allocating data to be transmitted among the available transmission channels, the actual channel and time of allocation is predetermined, and this predetermined time and channel allocation is inserted into the data stream to be transmitted to the receiver. The receiver must receive this information with sufficient time to adapt a particular channel processor to retrieve the desired data at the appropriate time.

Figure 4:
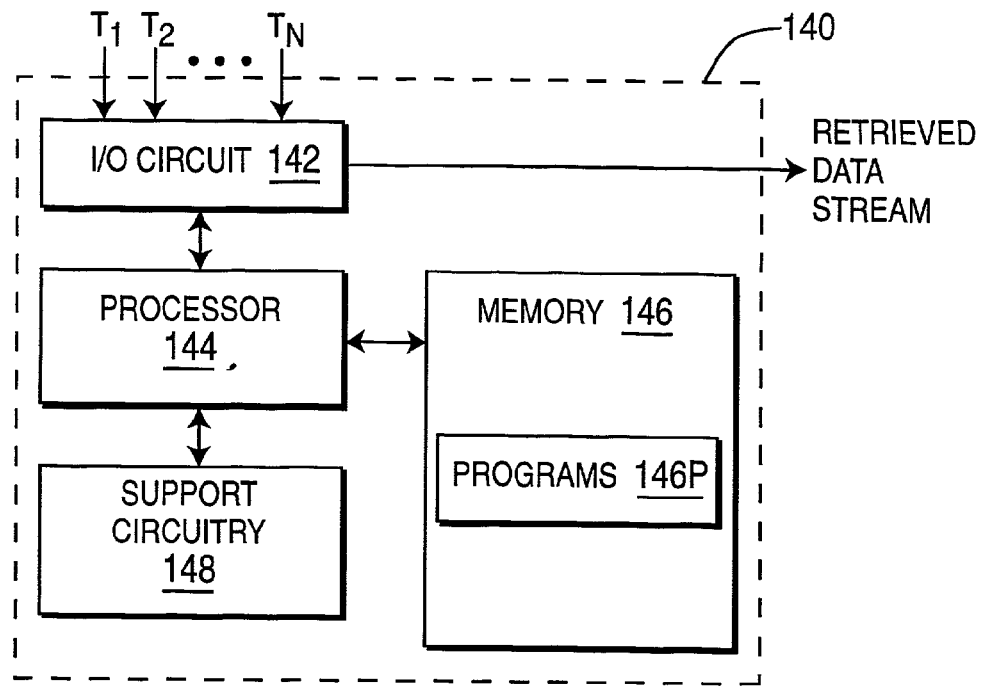
FIG. 4 depicts a exemplary high-level block diagram of a back-end processor suitable for use in the receiver of FIG. 1, and in accordance with the principles of the present invention.

FIG. 4 depicts a exemplary high-level block diagram of a back-end processor suitable for use in the receiver of FIG. 1, and in accordance with the principles of the present invention. The back-end processor 140 of FIG. 4 receives a plurality of transport stream portions $T_1$ through $T_N$ from the channel processors $130_1$ through $130_N$. The back-end processor 140 recombines appropriate transport stream portions (or elementary stream portions) to produce one or more transport streams. The one or more transport streams are further processed to extract elementary streams included therein, such as video streams, audio streams, data streams and other streams (or elementary streams). The elementary streams are then coupled to appropriate processing elements, such as decoders, data processors and the like. Thus, the back-end processor 140 receives a plurality of transport stream portions T1 through TN and responsively produces one or more retrieved data streams therefrom.

The back-end processor 140 comprises a processor 144 as well as memory 146 for storing various programs 146P. The processor 144 cooperates with conventional support circuitry 148, such as power supplies, clock circuits, cache memory and the like as well as circuits that assist in executing the software routines stored in the memory 146. As such, it is contemplated that some of the process steps discussed herein as software processes may be implemented within hardware, for example, as circuitry that cooperates with the processor 144 to perform various steps. The processor 144 also contains input/output (I/O) circuitry 142 that forms an interface between the back-end processor 140, the channel processors 130 and any elementary stream processing devices (not shown). Although the back-end processor 140 of FIG. 4 is depicted as a general-purpose computer that is programmed to perform various detection and processing functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Figure 5:
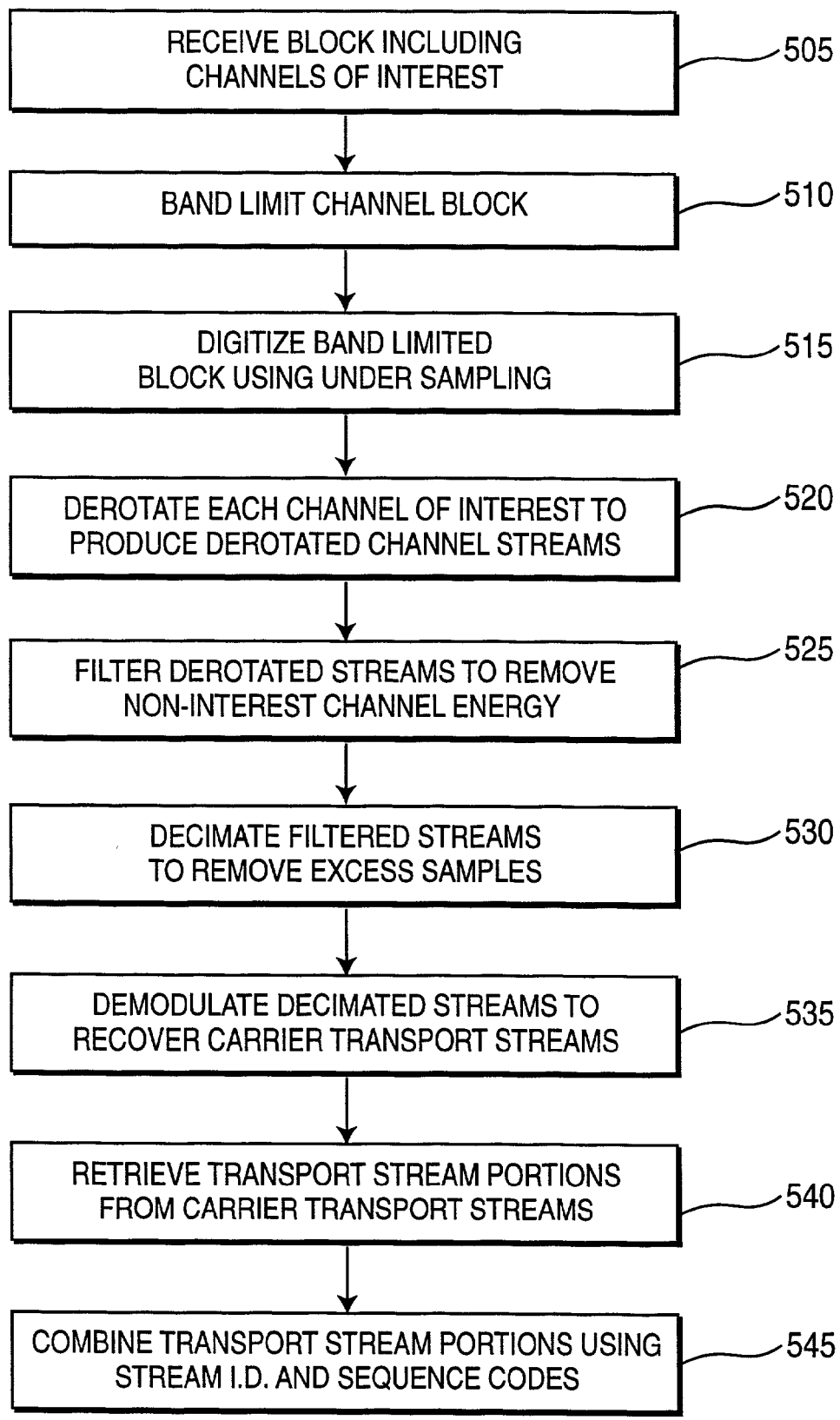
FIG. 5 depicts a exemplary flow diagram of a method in accordance with the principles of the present invention.

FIG. 5 depicts a exemplary flow diagram of a method in accordance with the principles of the present invention. Specifically, FIG. 5 depicts a flow diagram of a method 500 implementing various functions of the receiver 100 of FIG. 1. It is noted that the functions of the analog processor 110 are shown as steps 505–510; the functions of the A/D converter 120 are shown as step 515; the functions of channel processors 130 are shown as steps 525–540; and the functions of the back-end processor 140 are shown as step 545.

At step 505, a block of carrier frequencies including transport or carrier channels of interest are received. At step 510, the received channel block is band limited to exclude frequencies outside the block of desired channels. At step 515, the band-limited block of frequencies is digitized using, preferably, an undersampling technique. The digitizing function is described in more detail above with respect to A/D converter 120 of FIG. 1. The reception and band limiting functions 505, 510 are described in more detail above with respect to the analog processor 110 of FIG. 1.

At step 520, each of the channels of interest within the digitized and band-limited block of channels is derotated to produce a respective derotated stream providing the channel of interest. At step 525, each of the derotated streams is filtered to remove the channel energy of other channels (i.e., the channel energy associated with channels not to be processed by the particular channel processor 130). At step 530, each of the filtered and derotated streams is decimated to remove excess samples. At step 535, each of the decimated streams is demodulated to recover the respective carrier transport streams. As previously discussed, the carrier transport streams include indicia of stream identifier and sequence code for each packet or group of packets used to form, illustratively, an MPEG transport stream. Optionally, the transport streams include channel identification and time of transmission data. The functions of steps 520–540 are discussed in more detail above with respect to the channel processors 130 of the receiver 100 of FIG. 1.

At step 540, the transport stream portions are retrieved from the carrier transport streams. At step 545, the transport stream portions are combined into whole transport streams using the stream ID and sequence code information. The combined transport streams are then processed in a standard manner by video decoders, audio decoders, data processors or other elementary stream processing circuitry.

In one embodiment of the invention, only a subset of the received channels is processed. That is, to reduce costs and complexity within the receiver 100 of FIG. 1, two or more channel processors 130 are utilized. However, the number of channel processors 130 actually utilized is less than the number of channels present within output signal S3 of the A/D converter 120. In this embodiment, channel identifier and channel transmit time information is utilized to cause at least one of the channel processors 130 to selectively process different channels at different times. In this manner, the selected at least one channel processor is caused to "hop" between different channels such that all of the data necessary to reconstruct an initial bitstream may be retrieved utilizing less than a full complement of channel processors.

Figure 6:
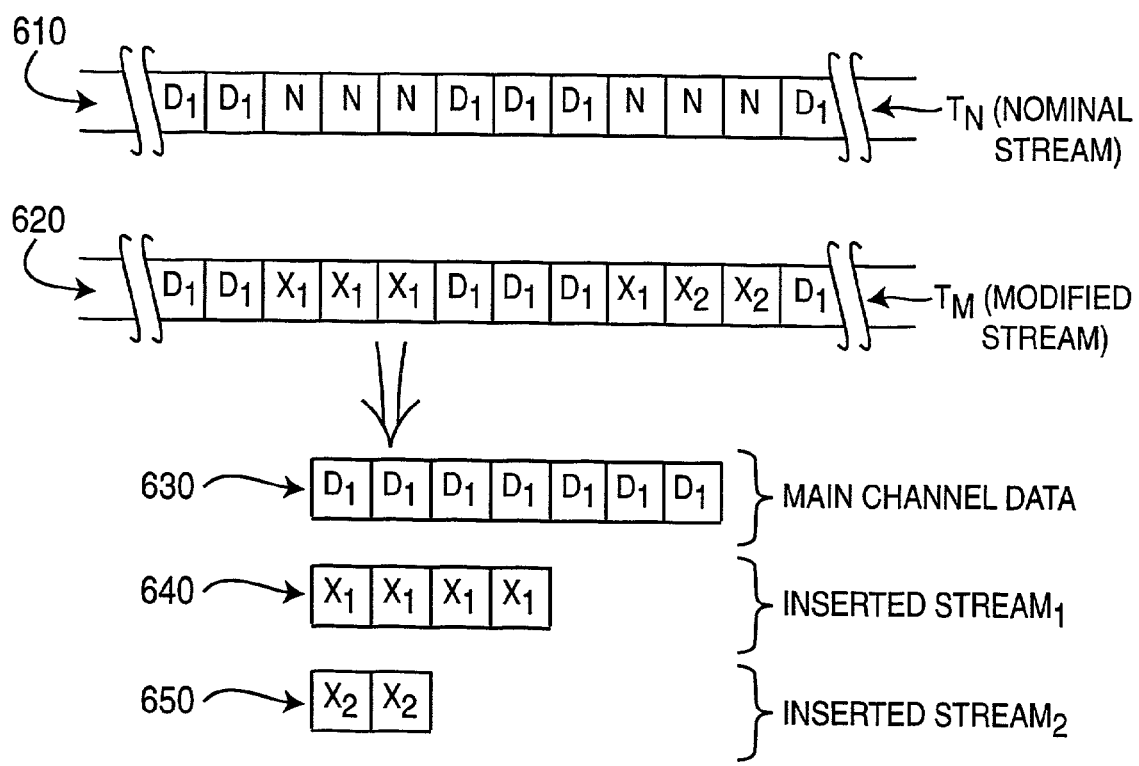
FIG. 6 depicts a exemplary graphical representation of packet stream processing in accordance with the principles of the present invention.

FIG. 6 depicts a graphical representation of exemplary packet stream processing performed in accordance with the principles of the present invention. Specifically, a nominal transmission channel packet stream 610 is shown comprising a plurality of data packets D1 interspersed with NULL packets N. After processing according to the invention, the NULL packets N in the nominal transport stream 610 are replaced by packets from a plurality of inserted streams. Specifically, a modified stream 620 is shown comprising the initial data packets D1 interspersed with inserted data packets X1 and X2 from the respective bitstreams. In this manner, upon transmitting the modified stream 620, no bandwidth is wasted by transmitting NULL packets.

At a receiver, the main channel data packets D1 are retrieved as data stream 630, the first inserted stream packets X1 are retrieved as data stream 640 and the second inserted stream packets X2 are retrieved as data stream 650. It is noted that each of the packets X inserted into the stream conform to the packet structure discussed above with respect to FIGS. 1 through 5.

A method, apparatus, and data structure suitable for use in a transmitter within a system, in accordance with the principles of the present invention, are disclosed in simultaneously filed U.S. patent application Ser. No. 09/942,886. In that disclosure, apparatus and method are provided wherein a data stream to be transmitted to a receiver comprising a plurality of data packet structures is encapsulated within a data packet structure adapted to a transmission medium or network. Each packet or group of packets included within a payload portion of the encapsulating data structure is associated with a stream identification and sequence code, as discussed above. In one embodiment, the header portion of the network packet structure is adapted to include a stream identifier field and a sequence code field for storing this information. In one embodiment, the header portion of the network packet structure is further adapted to include a channel identifier field and a time of transmission field for identifying which transport channel will carry desired data, and at what time the desired data will be carried. In another embodiment, the fields are inserted into the header portions of the underlying packets to be transported (i.e., the packets to be encapsulated). Also disclosed is transmission channel bandwidth monitoring and utilization apparatus and methods, whereby a single datastream to be transmitted may be conveyed to a receiver using multiple channels by, illustratively inserting data packets within the data stream in place of NULL packets. The NULL packets are normally inserted within a data stream channel when data to be transmitted is not otherwise available. The processing of NULL packets is discussed in more detail in the above-referenced U.S. patent application.

The receiver of the present invention, by simultaneously processing multiple received channels and extracting therefrom respective portions of a complete bitstream allows more efficient utilization of the available bandwidth of each channel to be processed.

Advantageously, a receiver in accordance with the principles of the present invention, eliminates the typical analog conversion stage found in a direct conversion receiver. Specifically, the analog mixers and oscillators are avoided. Previous arrangements directly convert to baseband a single channel, such as the frequencies associated with one channel of either right hand or left hand circular polarization as provided by a single transponder.

The invention provides the capability to not only down convert or receive one channel, but to receive N channels simultaneously. All of the N down-converted channels are included within a digital bit stream, which is processed digitally to recover in parallel any of the N original transponder channels. In an analog system, such capability requires the use of N analog tuners to select the N analog signals for subsequent processing. Since the N analog tuners at subsequent processing operate on RF signals that cannot be split due to the power domain processing of such signals, the N analog tuners would be ganged together. Within the context of the present invention, the direct conversion processing of multiple channels simultaneously avoids this high cost tuning and processing arrangement.

Although various embodiments, which incorporate the teachings of the present invention, have been shown and described in detail herein, those skilled in the art can readily devise many other varied embodiments that still incorporate these teachings.

What is claimed is:

1. A method for processing a received analog signal having a plurality of carrier signals modulated thereon, comprising:
    band limiting the received analog signal to obtain a band limited analog signal;
    converting the band limited analog signal into a digital data stream representative of the plurality of carrier signals;
    extracting from said digital data stream, data carried by at least two of the plurality of carrier signals; and
    combining at least portions of the data extracted from said at least two carrier signals to form a complete bitstream, said extracted data having associated with it stream identifier and sequence code information for, respectively, identifying the complete bitstream corresponding to the extracted data and determining the position of the extracted data within the complete bitstream.

2. The method of claim 1, wherein said complete bitstream comprises a transport stream, said method further comprising:
    selecting transport packets within the extracted data having a stream identifier corresponding to said complete bitstream; and
    arranging the selected packets according to the respective sequence codes to form said complete bitstream.

3. The method of claim 1, wherein the extracted data comprise transport stream packets according to a first transport format, and the complete bitstream comprises a transport stream packet of the first transport format.

4. The method of claim 1, wherein the extracted data comprise transport stream packets according to a first transport format, and the complete bitstream comprises a transport stream of a second transport format.

5. The method of claim 4, wherein transport stream packets according to said first transport stream format are carried within a payload portion of transport stream packets according to said second transport format.

6. The method of claim 5, wherein said stream identifier and said sequence code is stored in a header portion of said transport stream packets according to said first format.

7. The method of claim 1, wherein said extracting step comprises:
    derotating each of the digitized plurality of carrier signals to produce respective derotated carrier signals; and
    demodulating each of at least two filtered carrier signals to extract therefrom respective data bearing streams.

8. The method of claim 7, wherein said extracting step further comprises:
    filtering each of the derotated carrier signals to reduce non-channel spectral energy; and
    decimating each of the filtered signals to reduce the number of data-representative samples.

9. The method of claim 1, wherein some of said extracted data has associated with it channel identification and time of transmission information for, respectively, indicating which of said plurality of carrier signals will carry portions of said complete bitstream and the time said portions will be carried.

10. The method of claim 1, wherein said extracting step includes:
    identifying a carrier signal having data corresponding to a desired complete bitstream; and
    processing said identified carrier signal to extract said data corresponding to said desired complete bitstream.

11. The method of claim 10, wherein said extracting step further includes:
    determining a time when said identified carrier signal will include said data corresponding to said desired complete bitstream, said identified carrier signal being processed at said determined time.

12. The method of claim 10, wherein some of said extracted data has associated with it channel identification information for indicating which of said plurality of carrier signals will carry said data corresponding to said desired complete bitstream.

13. The method of claim 12, wherein said extracted data is associated with said channel identification information and also is associated with time of transmission information for indicating the time when said identified carrier signal will include said data corresponding to said desired complete bitstream.

14. The method of claim 6, wherein some of said transport stream packets according to said first format have stored therein within said header portion channel identification and time of transmission information for, respectively, indicating which of said plurality of carrier signals carry portions of said complete bitstream and the time said portions will be carried.

15. A method for processing a received analog signal having a plurality of carrier signals modulated thereon, comprising:
   band limiting the received analog signal to correspond to a transmission frequency band of the received analog signal to obtain a band limited analog signal;
   converting the band limited analog signal into a digital data stream representative of the plurality of carrier signals;
   processing the digital data stream to pass a plurality of digitized carrier signals, each of said digitized carrier signals having modulated thereon, and within a channel bandwidth, a respective data bearing stream;
   derotating each of the digitized carrier signals to produce respective derotated carrier signals;
   demodulating each of at least two filtered carrier signals to extract therefrom respective data bearing streams; and
   combining data from at least two data bearing streams into a resultant data stream, said at least two data bearing streams comprising respective portions of said resultant data stream.

16. The method of claim 15, further comprising:
   filtering each of the derotated carrier signals to reduce non-channel spectral energy; and
   decimating each of the filtered signals to reduce the number of samples representing each data bearing stream.

17. The method of claim 15, wherein said resultant data stream comprises a transport stream, said method further comprising:
   identifying those transport packets within said first and second data bearing streams being associated with a stream identifier corresponding to said resultant stream; and
   arranging the identified packets according to a respective sequence codes associated with said identified packets to form said resultant stream.

18. The method of claim 17, wherein each of said simultaneously demodulated data bearing streams are transport streams according to a first transport format, and said resultant data bearing stream is a transport stream according to a second transport format.

19. The method of claim 15, wherein the data bearing streams comprise transport streams according to a first transport format, and the resultant data stream comprises a transport stream of said first transport format.

20. The method of claim 15, wherein the data bearing streams comprise transport streams according to a first transport format, and the resultant data stream comprises a transport stream of a second transport format.

21. The method of claim 20, wherein data according to said second transport stream format is carried within a payload portion of data packets according to said second format.

22. The method of claim 21, wherein each of said data packets according to said second format includes, in a header portion, a stream identifier and sequence code for data carried within a respective payload portion.

23. A method for processing a received analog signal having a plurality of carrier signals modulated thereon, comprising:
   band limiting the received signal to pass substantially those frequencies occupying a spectral transmission region between a first frequency $f_1$ and a second frequency $f_2$;
   converting, using an analog-to-digital converter having a sampling rate $f_s$, the band-limited signal to produce a digital signal therefrom, said sampling rate $f_s$ being greater than $f_2$;
   derotating each of a plurality of data bearing signals within said digital signal to produce respective derotated signals;
   filtering each of the respective derotated signals to remove channel energy outside of a respective defined channel;
   decimating each of the filtered and derotated signals to reduce the number of samples representing each data bearing signal;
   demodulating each of at least two filtered carrier signals to extract therefrom respective data bearing signal; and
   combining at least respective portions of at least two of the resulting decimated data bearing signals into a single data signal.

24. Apparatus for processing a received analog signal having a plurality of carrier signals and respective data modulated thereon, comprising:
   a band limiter, for band limiting the received analog signal to obtain a band limited analog signal;
   an analog to digital converter, for converting the band limited analog signal into a digital data stream representative of the plurality of carrier signals and respective data;
   a plurality of channel processors, for extracting from said digital data stream, data carried by respective carrier signals; and
   a processor, for combining at least portions of said data extracted from at least two carrier signals to produce a complete bitstream, said extracted data having associated with it stream identifier and sequence code information for determining, respectively, the complete bitstream corresponding to the data and the sequence within the complete bitstream of the data.

25. The apparatus of claim 24, wherein each of said channel processors comprises:
   a derotator, for derotating a respective digitized carrier signal to produce a respective derotated carrier signal; and
   a demodulator, for demodulating said respective derotated carrier signal to extract therefrom a data stream.

26. The apparatus of claim 24, wherein each of said channel processors further comprises:
   a filter, for filtering the respective derotated signals to remove channel energy outside of the respective defined channel; and
   a decimator, for decimating each of the filtered and derotated signals to reduce the number of samples representing the respective data.

27. The apparatus of claim 24, wherein
   said analog to digital converter utilizing a sampling rate less than twice the maximum frequency of interest within the plurality of data channels.

28. The apparatus of claim 24, wherein plurality of carrier signals substantially conform to a commonly polarized group of channels provided by a transponder.

* * * * *